(12) United States Patent
Frerichs et al.

(10) Patent No.: US 10,371,246 B2
(45) Date of Patent: Aug. 6, 2019

(54) BREATHER VENT ASSEMBLY FOR A VEHICLE TRANSMISSION

(71) Applicants: Todd A Frerichs, West Bloomfield, MI (US); John N Henley, Clarkston, MI (US)

(72) Inventors: Todd A Frerichs, West Bloomfield, MI (US); John N Henley, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 194 days.

(21) Appl. No.: 15/467,158

(22) Filed: Mar. 23, 2017

(65) Prior Publication Data

US 2017/0276230 A1   Sep. 28, 2017

Related U.S. Application Data

(60) Provisional application No. 62/312,663, filed on Mar. 24, 2016.

(51) Int. Cl.
| | |
|---|---|
| *B01D 46/00* | (2006.01) |
| *F16H 57/02* | (2012.01) |
| *F16H 57/027* | (2012.01) |
| *B01D 45/16* | (2006.01) |
| *B01D 53/00* | (2006.01) |

(52) U.S. Cl.
CPC ........... *F16H 57/027* (2013.01); *B01D 45/16* (2013.01); *B01D 53/002* (2013.01)

(58) Field of Classification Search
CPC ....... B01D 46/00; F16H 57/02; F16H 57/027; Y10T 74/2186

USPC ................... 55/320, 385.4, 385.3, 505, 510; 74/606 R; 220/371, 374
See application file for complete search history.

(56) References Cited

U.S. PATENT DOCUMENTS

| | | | | |
|---|---|---|---|---|
| 4,256,474 A | * | 3/1981 | Berger, Jr. | ........... B01D 29/114 96/152 |
| 5,026,407 A | * | 6/1991 | Tobey | ....................... E03D 5/00 128/205.12 |
| 6,015,444 A | * | 1/2000 | Craft | ..................... F16H 57/027 220/371 |
| 6,447,565 B1 | | 9/2002 | Raszkowski et al. | |
| 7,044,150 B2 | | 5/2006 | Seidl | |
| 8,454,719 B2 | * | 6/2013 | Tesner | .................. F16H 57/027 55/385.3 |

* cited by examiner

*Primary Examiner* — Amber R Orlando
*Assistant Examiner* — Minh Chau T Pham
(74) *Attorney, Agent, or Firm* — Ralph E. Smith

(57) ABSTRACT

A breather vent assembly includes a vent main body defining an internal vent passage and including a proximal end, a distal end, and an upwardly extending retainer portion disposed outward of the distal end. A cap is coupled to the vent main body and disposed at the distal end. A tortuous path is defined between the vent main body and the cap and a fluid vapor flows through the internal vent passage and the tortuous path to thereby vent the fluid vapor from a transmission. A reservoir is defined between the distal end and the upwardly extending retainer portion and configured to receive a condensate when a portion of the fluid vapor condenses in the tortuous path. A drain passage extends through the vent main body and fluidly couples the reservoir and the internal vent passage such that the condensate in the reservoir is drained back to the vehicle transmission.

18 Claims, 9 Drawing Sheets

BREATHER VENT ASSEMBLY FOR A VEHICLE TRANSMISSION

CROSS-REFERENCE TO RELATED APPLICATION

This application claims the benefit of U.S. Provisional Application Ser. No. 62/312,663, filed Mar. 24, 2016, the contents of which are incorporated herein by reference.

FIELD

The present application relates generally to relief or breather valves and, more particularly, to a breather vent assembly for a motor vehicle transmission.

BACKGROUND

Conventional vehicle transmissions may include an air vent assembly to allow air to flow into and out of a transmission housing during operation, which is commonly referred to as transmission breathing. As heat is generated in the transmission, the temperature of air and hydraulic fluid increases therein, which increases the internal pressure within the transmission housing. Without the air vent, the increased internal pressure relative to the atmospheric exterior pressure may force fluid past seals of the housing. When the transmission housing temperature is decreased relative to the exterior temperature, the pressure differential is reversed and air may flow into the transmission through the air vent. Without the air vent, contaminants such as dirt and water may be drawn into the transmission through the seals.

Accordingly, a vent or breather is typically incorporated into transmissions to minimize pressure differentials between the interior and exterior of the transmission housing. In some situations, transmission fluid vapor may escape from the housing and condense on the outer surface of the transmission housing. This may be perceived as a fluid leak by a customer and may also potentially reduce the volume of fluid inside the transmission over time. Accordingly, while known air vent systems work for their intended purpose, an improved breather vent is desirable.

SUMMARY

In accordance with one example aspect of the invention, a breather vent assembly for a vehicle transmission is provided. The assembly includes, in an exemplary implementation, a vent main body defining an internal vent passage and including a proximal end, a distal end, and an upwardly extending retainer portion disposed outward of the distal end, the proximal end configured to couple to the transmission. A cap is coupled to the vent main body and disposed at the distal end. A tortuous path is defined between the vent main body and the cap such that a fluid vapor from the transmission is configured to flow through the internal vent passage and subsequently through the tortuous path to thereby vent the fluid vapor from the transmission. A reservoir is defined between the distal end and the upwardly extending retainer portion, the reservoir in fluid communication with the tortuous path and configured to receive a condensate when a portion of the fluid vapor condenses in the tortuous path. A drain passage extends through the vent main body and fluidly couples the reservoir and the internal vent passage such that the condensate in the reservoir is drained back to the vehicle transmission.

In addition to the foregoing, the described assembly may include one or more of the following features: wherein the cap comprises an inner wall and an outer wall, the inner wall disposed between the vent main body distal end and the upwardly extending retainer portion, and the outer wall disposed outwardly of the upwardly extending retainer portion; wherein the inner wall is disposed radially inward of the outer wall; wherein the inner wall is coupled to a first base member and the outer wall is coupled to a second base member, the first base member coupled to the second base member; a plurality of spacers extending outwardly from the vent main body distal end, the spacers configured to space the cap apart from the distal end such that a plurality of fluid passages are defined between the vent main body distal end and the cap; wherein the upwardly extending retainer portion includes a lower portion and a wall portion, the lower portion coupled to the vent main body, and the wall portion extending from the lower portion substantially parallel to the vent main body; wherein the lower portion defines an angled bottom wall at least partially defining the reservoir and configured to direct the condensate toward the drain; and wherein the vent main body defines a lip spacing the reservoir from the drain such that a predetermined amount of condensate collects in the reservoir before the condensate enters the drain.

In addition to the foregoing, the described assembly may include one or more of the following features: wherein the vent main body distal end defines a flange extending outwardly into the tortuous path; wherein the tortuous path makes a first turn of approximately 180° and a second turn of approximately 180°; wherein the fluid vapor from the vent passage turns approximately 180° before the first turn of the tortuous path; wherein a first high flow rate area is defined between the vent main body distal end and the cap, a first low flow rate area is defined between the vent main body and the cap, a second low flow rate area is defined at the first turn, a third low flow rate area is defined between the retainer portion and the cap, and a second high flow rate area is defined at the second turn, wherein the first and second high flow rate areas are configured to promote fluid vapor separation due to inertia and centrifugal forces, and the first, second, and third low flow rate areas are configured to allow time for condensing of the fluid vapor; wherein a diameter of the vent passage is greater than a diameter of the drain passage to facilitate directing the fluid vapor through the vent passage rather than through the drain passage; wherein the drain passage is disposed substantially perpendicular to the vent passage; and wherein the drain passage extends through the vent main body at a non-orthogonal angle relative to the tortuous path.

In accordance with another example aspect of the invention, a breather vent assembly to minimize pressure differentials between the interior and exterior of a vehicle transmission is provided. The assembly includes, in an exemplary implementation, a tubular vent main body having a proximal end, a distal end, and defining a vent passage configured to couple to the vehicle transmission and receive a fluid vapor therefrom, the proximal end configured to couple to the vehicle transmission. A retainer portion is coupled to the vent main body and disposed radially outward thereof, the retainer portion including a lower portion and a wall portion, the wall portion extending from the lower portion substantially parallel to the vent main body. A cap includes a base member, an inner wall, and an outer wall, the inner wall extending from the base member and disposed between the vent main body and the wall portion, the outer wall extending from the base member and disposed radially outward of the wall portion. A tortuous path is defined between the vent main body and the cap and configured to receive the fluid vapor. A reservoir is defined between the vent main body and the retainer portion, the reservoir in fluid communication with the tortuous path and configured to receive a condensate when a portion of the fluid vapor condenses in the tortuous path. A drain passage extends through the vent main body and fluidly couples the reservoir and the vent passage such that the condensate in the reservoir is drained back to the vehicle transmission. The tortuous path includes a first section extending through the vent passage, a second section extending between the vent main body distal end and the cap base, a third section extending between the vent main body and the inner wall, a fourth section extending between the vent main body and the wall portion, a fifth section extending between the inner wall and the wall portion, a sixth section extending between the inner wall and the outer wall, and a seventh section extending between the wall portion and the outer wall.

In addition to the foregoing, the described assembly may include one or more of the following features: wherein the first section, the third section, the fifth section, and the seventh section are substantially parallel; wherein the second section, the fourth section, and the sixth section are substantially parallel to each other and substantially perpendicular to the first, third, fifth, and seventh sections; wherein the tortuous path is redirected approximately 180° between the first and third sections, the third and fifth sections, and the fifth and seventh sections.

DESCRIPTION

Described herein is a breather vent assembly for a transmission. In one embodiment, the transmission is an electrically variable transmission. However, the described breather vent assembly may be used with any suitable transmission or housing that requires venting. In one example implementation, the breather vent includes an attachment feature on a main vent body which is configured to fasten to a transmission housing. The breather vent assembly is seated to the transmission, for example, with a fastening joint or additional seal. The main vent body includes a tube which connects an internal cavity of the transmission to the exterior environment. The vent main body is covered by a cap which redirects vented gas approximately 180° back towards the transmission and into a reservoir area configured to collect condensed gas vapor.

As discussed herein in greater detail, the gas vapor may include or carry lubricating vapor/fluid/mist from the transmission and, when it does, the condensed gas vapor will include condensed lubricating fluid in liquid form that will be redirected back to the transmission via a drain path of the breather vent assembly of the present application. Thus, it will be appreciated that while the discussion will continue with reference to gas vapor and condensed gas vapor, such vapor and condensed vapor may include lubricating fluid of the transmission, such as transmission oil.

In the illustrated example, the breather vent assembly drain path extends from the reservoir or reservoir area back to the source or internal cavity. The remaining vented gas is again redirected approximately 180° to the top of the vent, and then again another 180° where it exits via an opening in a cap or water shield. Such an arrangement of the tortious path and reservoir area coupled with the drain back provides for removing transmission fluid vapor from the vapor exiting the breather vent assembly thereby eliminating the potential for vapor exiting the breather vent assembly to include transmission fluid that may condense on an exterior surface of the transmission housing. Moreover, the breather vent assembly described herein does not use a filter medium (e.g., steel wool, screen, paper, felt, etc.), which is prone to saturation, plugging, and leaking.

Figure 1:
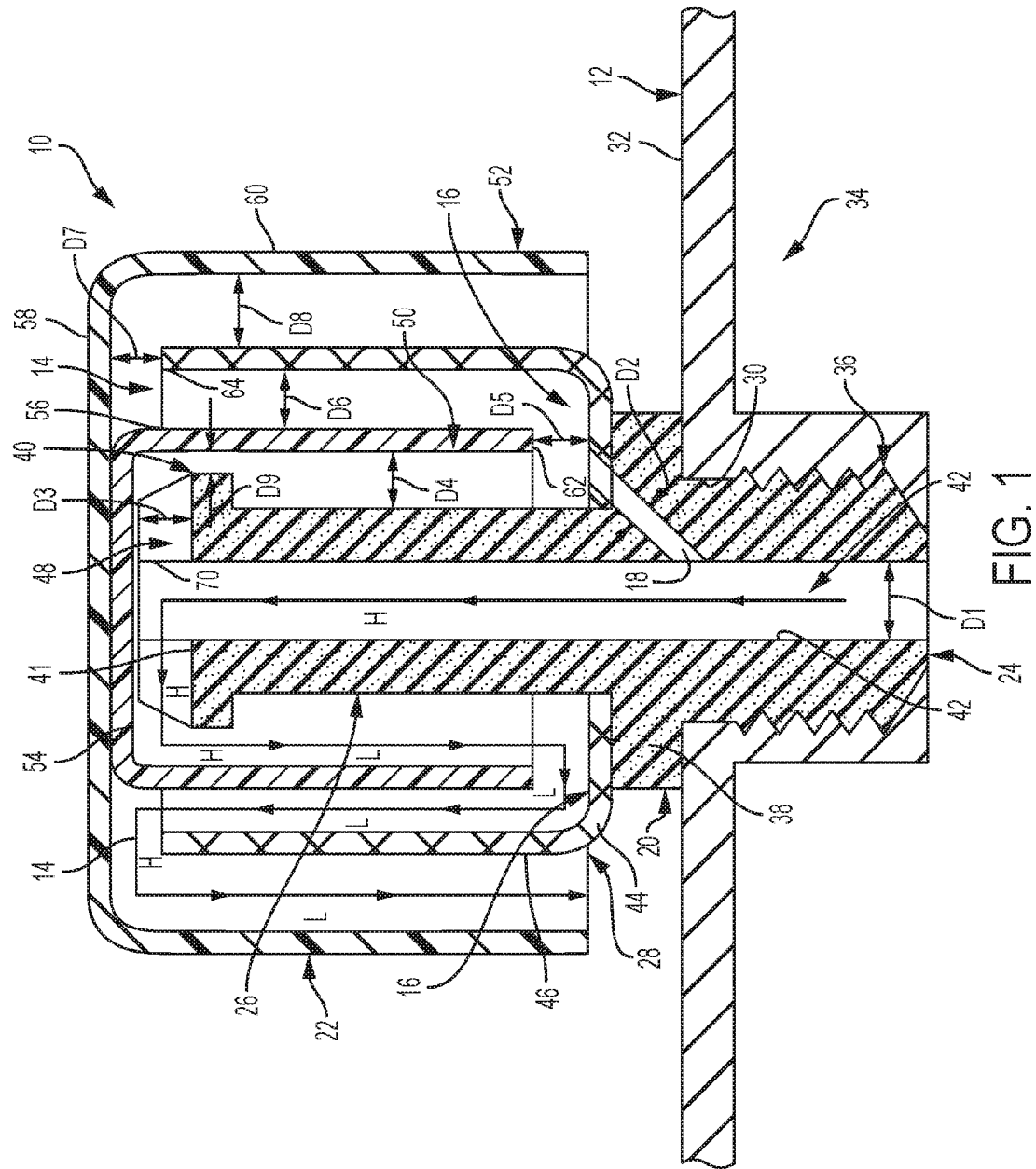
FIG. 1 is a cross-sectional view of an example breather vent assembly for a vehicle transmission, in accordance with the principles of the present application.
Figure 2:
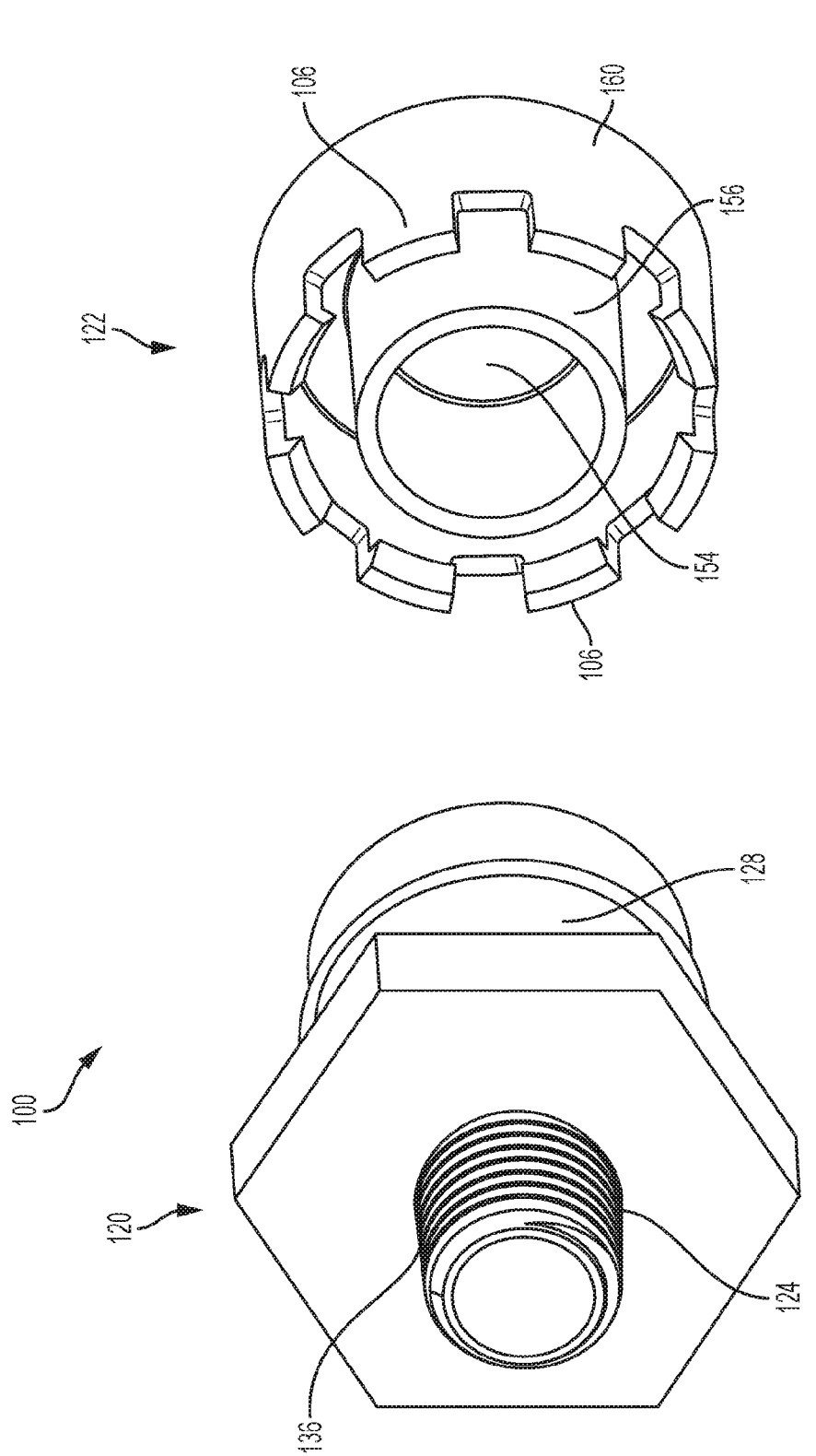
FIG. 2 is a perspective view of another example breather vent assembly for a vehicle transmission, before assembly, and in accordance with the principles of the present application.
Figure 3:
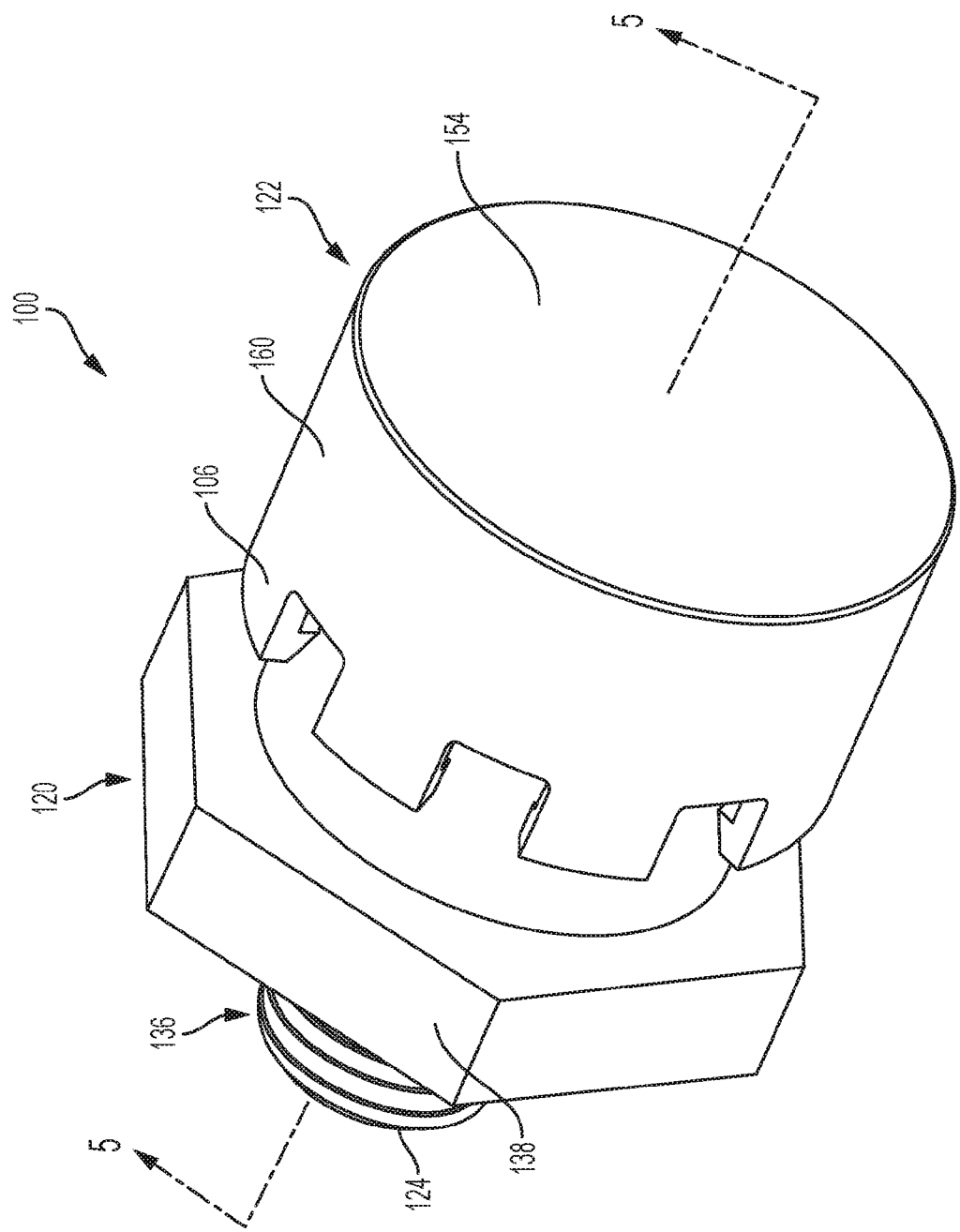
FIG. 3 is a perspective view of the breather vent assembly shown in FIG. 2 after assembly, in accordance with the principles of the present application.

With reference to FIG. 1, one example of a breather vent assembly 10 for a transmission 12 is shown. The breather vent assembly 10 provides a tortuous path 14 for vapor to be vented out of the transmission 12. The breather vent assembly 10 further defines a reservoir 16 to collect condensed gas vapor, which reduces or prevents fluid from escaping the transmission 12. As such, rather than just act as a plug, breather vent assembly 10 captures and collects condensed vapor by providing low flow rate zones to allow time for condensing, and provides high flow rate zones during flow redirection, which promotes vapor to separate due to inertia and centrifugal forces. Finally, the condensed vapor is returned to the source via a passage or drain 18.

In the example implementation, breather vent assembly 10 generally includes a vent main body 20 and a cap 22. The tortuous path 14 is defined between the main body 20 and the cap 22, as illustrated in FIG. 1 and described herein in more detail.

The vent main body 20 is tubular and generally includes a proximal or connecting tube portion 24, a distal or vent extension portion 26, and an upwardly extending retainer portion 28. The connecting tube portion 24 is configured to secure the vent main body 20 within an aperture 30 formed within a housing 32 of the transmission 12. As such, the connecting tube portion 24 connects an internal cavity 34 of the transmission 12 with the exterior environment. In the illustrated example, tube portion 24 includes threads 36 configured to be threadably received within aperture 30. However, the breather vent assembly 10 may be coupled to the transmission housing 32 by various other methods (e.g., via welding). The connecting tube portion 24 further defines a shoulder portion 38, which is configured as a seat for retainer portion 28.

The vent extension portion 26 extends upwardly from the connecting tube portion 24 and includes a lip or flange 40 at its distal end 41 where at least one passage 48 is formed therein. Moreover, distal end 41 of vent extension portion 26 includes one or more spacers 70 extending upwardly therefrom. Spacers 70 are configured to space cap 22 away from the distal end 41 and define passages 48. Main body 20 defines a vent passage 42 having a width or diameter D1 that is configured to receive vented gas from the transmission internal cavity 34. Vent passage 42 is configured to supply the vented gas to the tortuous path 14 via passage 48.

Retainer portion 28 generally includes a lower or seating portion 44 and an upwardly extending wall portion 46. The seating portion 44 is seated against shoulder portion 38 and wall portion 46 extends upwardly therefrom parallel to or substantially parallel to vent passage 42. In this way, seating portion 44, wall portion 46, and vent extension portion 26 together define a reservoir 48 configured to collect condensed vapor from the vapor traveling through vent passage 42 and the tortuous path 14. The collected condensed vapor is subsequently directed to the transmission internal cavity 34 via the drain 18. In one example implementation drain 18 has a width or diameter D2 that is less than D1, which facilitates directing the vent vapor through vent passage 42 rather than through drain 18.

The cap 22 is configured to couple to the distal end 41 of vent extension portion 26 and generally includes an inner portion 50 and an outer portion 52. The inner portion 50 includes a base member 54 and an inner wall 56 extending downwardly therefrom. The inner portion 50 may be received within the outer portion 52 and coupled thereto. The outer portion 52 includes a base member 58 and an outer wall 60 extending downwardly therefrom.

As shown in the illustrated implementation, cap 22 is disposed about the vent main body 20 such that inner wall 56 is disposed radially outward of vent extension portion 26 and radially inward of retainer portion 28. In this manner, a width or diameter D3 of passage 48 is defined between distal end 41 and cap 22, a distance D4 is defined between the vent extension portion 26 and the inner wall 56, a distance D5 is defined between an end 62 of the inner wall 56 and the seating portion 44, and a distance D6 is defined between the inner wall 56 and the upwardly extending wall portion 46. In the illustrated example, vent extension portion 26, inner wall 56, wall portion 46, and outer wall 60 extend parallel to or substantially parallel to each other.

Cap 22 is further disposed about the vent main body 20 such that outer wall 60 is disposed radially outward of retainer portion 28 such that a distance D7 is defined between an end 64 of upwardly extending wall portion 46 and the outer portion base 58, a distance D8 is defined between the upwardly extending wall portion 46 and the outer wall 60, and a distance D9 is defined between flange 40 and inner wall 56.

In one example implementation, the flow area defined by D1 is greater than or equal to the flow area defined by D3. The flow area defined by D3 is greater than or equal to the flow area defined by D9. The flow area defined by D9 is less than the flow area defined by D4. The flow area defined by D4 is less than the flow area defined by D5. The flow area defined by D5 is greater than the flow area defined by D6. The flow area defined by D6 is greater than the flow area defined by D4. The flow area defined by D7 is less than the flow area defined by D6. The flow area defined by D8 is greater than the flow area defined by D7. The flow area defined by D8 is greater than the flow area defined by D6.

As such, the flow areas defined by D1, D3, D9, and D7 define high flow rate areas 'H'. The flow areas defined by D4, D5, D6, and D8 are greater than the high flow rate areas, thereby defining low flow rate areas 'L' of high flow volume. As discussed above, the low flow rate areas/zones allow time for condensing, while the high flow rate areas/zones and associated flow redirections promote the vapor to separate due to inertia and centrifugal forces such that any condensed vapor is collected in the reservoir 16 and returned to the transmission 12 via the drain 18.

In operation, when the pressure is increased in transmission 12, vapor enters vent passage 42 of the vent main body 20 toward cap 22. The vapor is then redirected 180° or approximately 180° back toward the transmission 12 and reservoir 16 where condensed vapor is deposited. The condensate is drained via drain 18 back to the transmission 12, and the remaining gas vapor is then again redirected 180° or approximately 180° back toward a top of cap 22. The gas vapor is then again redirected 180° or approximately 180° toward the transmission 12 before exiting the breather vent assembly 10 to the atmosphere and/or exterior of the transmission 12.

With reference to FIGS. 2-5, another example of a breather vent assembly 100 for transmission 12 is shown. Breather vent assembly 100 is similar to breather vent assembly 10. However, breather vent assembly 100 includes a reservoir 116 with an angled bottom wall 102 (see FIG. 5), which is configured to flow the condensed vapor toward a drain 118. A lip 104 enables a predetermined amount of condensate to collect in the reservoir 116 before the height of the condensate reaches the height of drain 118. Further, at least some components of assembly 100 are fabricated from plastic.

In the example embodiment, breather vent assembly 100 provides a tortuous path 114 for vapor to be vented out of the transmission 12. The breather vent assembly 100 further defines reservoir 116 to collect condensed gas vapor, which reduces or prevents fluid from escaping the transmission 12. Moreover, reservoir 116 includes angled bottom wall 102, which is angled downwardly toward a center of the breather vent assembly 100 where drain 118 is located. This facilitates preventing buildup of condensed vapor within breather vent assembly 100 and quickly returns the condensed vapor to the transmission 12. As such, rather than act as a plug, breather vent assembly 100 similarly captures and collects condensed vapor by providing low flow rate zones to allow time for condensing, and provides high flow rate zones during flow redirection, which promotes vapor to separate due to inertia and centrifugal forces. Finally, the condensed vapor is directed to drain 118 via the downwardly angled bottom wall 102 and subsequently returned to its source.

Figure 4:
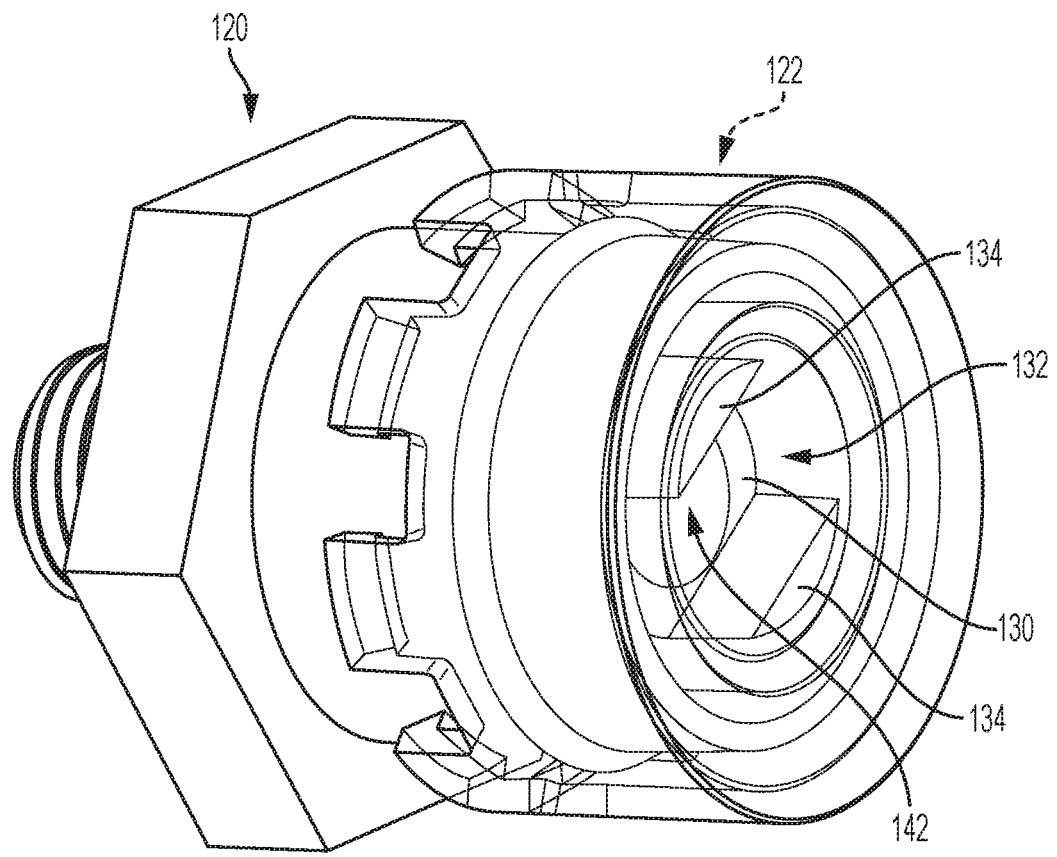
FIG. 4 is another perspective view of the breather vent assembly shown in FIG. 3 in accordance with the principles of the present application.
Figure 5:
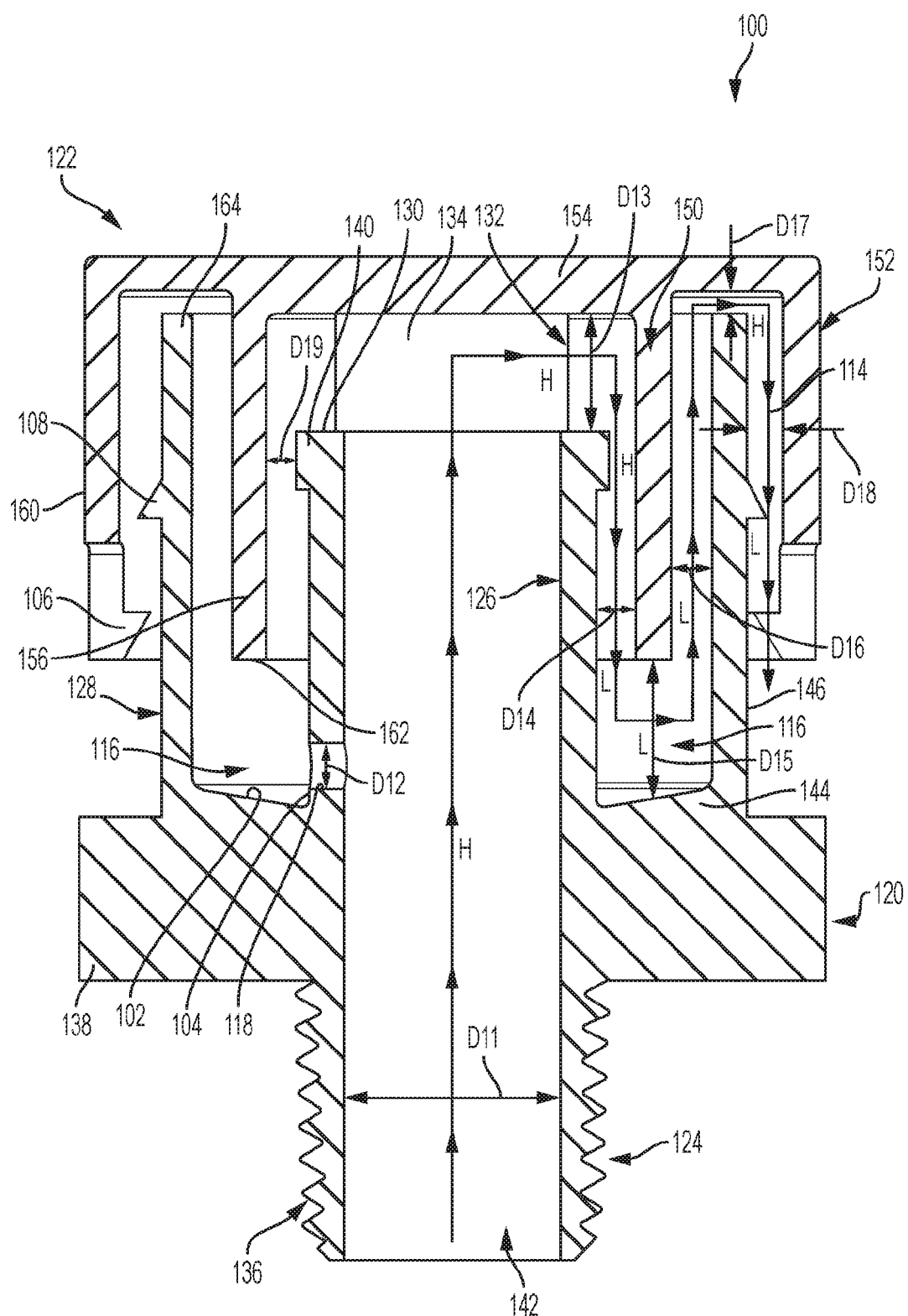
FIG. 5 is a cross-sectional view of the breather vent assembly shown in FIG. 3 and taken along line 5-5, in accordance with the principles of the present application.

As shown in FIG. 4, in the example implementation, breather vent assembly 100 generally includes a vent main body 120 and a cap 122. The tortuous path 114 is defined between the main body 120 and the cap 122, as illustrated in FIG. 5 and described herein in more detail.

The vent main body 120 generally includes a proximal or connecting tube portion 124, a distal or vent extension portion 126, and an upwardly extending retainer portion 128. The connecting tube portion 124 is configured to secure the vent main body 120 within aperture 30 of the transmission housing 32. As such, the connecting tube portion 24 connects internal cavity 34 of the transmission 12 with the exterior environment. In the illustrated example, tube portion 124 includes threads 136 configured to be threadably received within aperture 30. However, the breather vent assembly 100 may be coupled to the transmission housing 32 by various other methods (e.g., via welding). The connecting tube portion 124 further defines a shoulder portion 138 integrated with retainer portion 128.

The vent extension portion 126 extends upwardly from the connecting tube portion 124 and includes a lip or flange 140 at its distal end 130 where at least one passage 132 is defined. Moreover, the distal end 130 of vent extension portion 126 includes one or more spacers 134 extending upwardly therefrom (see FIG. 4). Spacers 134 are configured to space cap 122 away from the distal end 130 of vent extension portion 126 and define passages 132. Main body 120 defines a vent passage 142 having a width or diameter D11 that is configured to receive vented gas from the transmission internal cavity 34. Vent passage 142 is configured to supply the vented gas to the tortuous path 114 via passage 132.

Retainer portion 128 generally includes a lower portion 144 and an upwardly extending wall portion 146. The lower portion 144 is disposed adjacent shoulder portion 138, and wall portion 146 extends upwardly from the lower portion 144 parallel to or substantially parallel to vent passage 142. In this way, lower portion 144, wall portion 146, and vent extension portion 126 together define a reservoir 116 configured to collect condensed vapor from the vapor traveling through the vent passage 142 and the tortuous path 114. Moreover, as described above, lower portion 144 includes a wall 102 that slopes downwardly as it extends from wall portion 146 toward vent extension portion 126. As such, angled wall 102 directs the condensed vapor to the transmission internal cavity 34 via drain 118. In one example implementation, drain includes a width or diameter D12 that is less than D11, which facilitates directing the vent vapor through vent passage 142 rather than through drain 118.

In the example embodiment, cap 122 is configured to couple to retainer portion 128, for example via arms or clips 106 (see FIGS. 2-4) and corresponding clip 108. Cap 122 generally includes an inner portion 150 and an outer portion 152. The inner portion 150 includes a base member 154, and an inner wall 156 and an outer wall 160 extend downwardly therefrom. The inner portion 150 may be received within the outer portion 152 and coupled thereto.

As shown in FIGS. 4 and 5, cap 122 is disposed about the vent main body 120 such that an inner wall 156 is disposed radially outward of vent extension portion 126 and radially inward of wall portion 146. In this manner, a width or diameter D13 of passage 132 is defined between distal end 130 and cap 22, a distance D14 is defined between the vent extension portion 126 and the inner wall 156, a distance D15 is defined between an end 162 of the inner wall 156 and the lower portion 144, and a distance D16 is defined between the inner wall 156 and the upwardly extending wall portion 146. In the illustrated example, vent extension portion 126, inner wall 156, wall portion 146, and outer wall 160 extend parallel to or substantially parallel to each other.

Cap 122 is further disposed about the vent main body 120 such that outer wall 160 is disposed radially outward of retainer portion 128 such that a distance D17 is defined between an end 164 of upwardly extending wall portion 146 and the base 154, a distance D18 is defined between the upwardly extending wall portion 146 and the outer wall 160, and a distance D19 is defined between flange 140 and inner wall 156.

In one example implementation, the flow area defined by D11 is greater than or equal to the flow area defined by D13. The flow area defined by D13 is greater than or equal to the flow area defined by D19. The flow area defined by D19 is less than the flow area defined by D14. The flow area defined by D14 is less than the flow area defined by D15. The flow area defined by D15 is greater than the flow area defined by D16. The flow area defined by D16 is greater than the flow area defined by D14. The flow area defined by D17 is less than the flow area defined by D16. The flow area defined by D18 is greater than the flow area defined by D17. The flow area defined by D18 is greater than the flow area defined by D16.

As such, the flow areas defined by D11, D13, D19, and D17 define high flow rate areas 'H'. The flow areas defined by D14, D15, D16, and D18 are greater than the high flow rate areas, thereby defining low flow rate areas 'L' of high flow volume. As discussed above, the low flow rate areas/zones allow time for the vapor to condense, while the high flow rate areas/zones and associated flow redirections promote the vapor to separate due to inertia and centrifugal forces such that any condensed vapor is collected in the reservoir 116 and returned to the transmission 12 via the drain 118.

In operation, when the pressure is increased in transmission 12, vapor enters vent passage 142 of the vent main body 120 toward cap 122. The vapor passes through passages 132 and is then redirected 180° or approximately 180° back toward the transmission 12 and reservoir 116 where condensed vapor is deposited. The condensate is drained via 118 back to the transmission 12, and the remaining gas vapor is then again redirected 180° or approximately 180° back toward a top of cap 122. The gas vapor is then again redirected 180° or approximately 180° back toward the transmission 12 before exiting the breather vent assembly 100 to the atmosphere and/or exterior of the transmission 12.

With reference to FIGS. 6-9, yet another example of a breather vent assembly 200 for transmission 12 is shown. Breather vent assembly 200 is similar to breather vent assembly 100 and includes a reservoir 216 with an angled bottom wall 202 (see FIG. 9), which is configured to flow the condensed vapor toward a drain 218. A lip 204 enables a predetermined amount of condensate to collect before the height of the condensate reaches the height of drain 218. Further, some and/or all components of assembly 200 are fabricated from metal.

In the example embodiment, breather vent assembly 200 provides a tortuous path 214 for vapor to be vented out of the transmission 12. The breather vent assembly 200 further defines reservoir 216 to collect condensed gas vapor, which reduces or prevents fluid from escaping the transmission 12. Moreover, reservoir 216 includes angled bottom wall 202, which is angled downwardly toward a center of the breather vent assembly 200 where drain 218 is located. This facilitates preventing buildup of condensed vapor within breather vent assembly 200 and quickly returns the condensed vapor to the transmission 12. However, lip 204 is defined such that a predetermined amount of condensate buildup must occur before the condensate subsequently flows into drain 218. As such, rather than act as a plug, breather vent assembly 200 similarly captures and collects condensed vapor by providing low flow rate zones to allow time for condensing, and provides high flow rate zones during flow redirection, which promotes vapor to separate due to inertia and centrifugal forces. Finally, the condensed vapor is directed to drain 218 via the downwardly angled bottom wall 202 and subsequently returned to its source.

Figure 6:
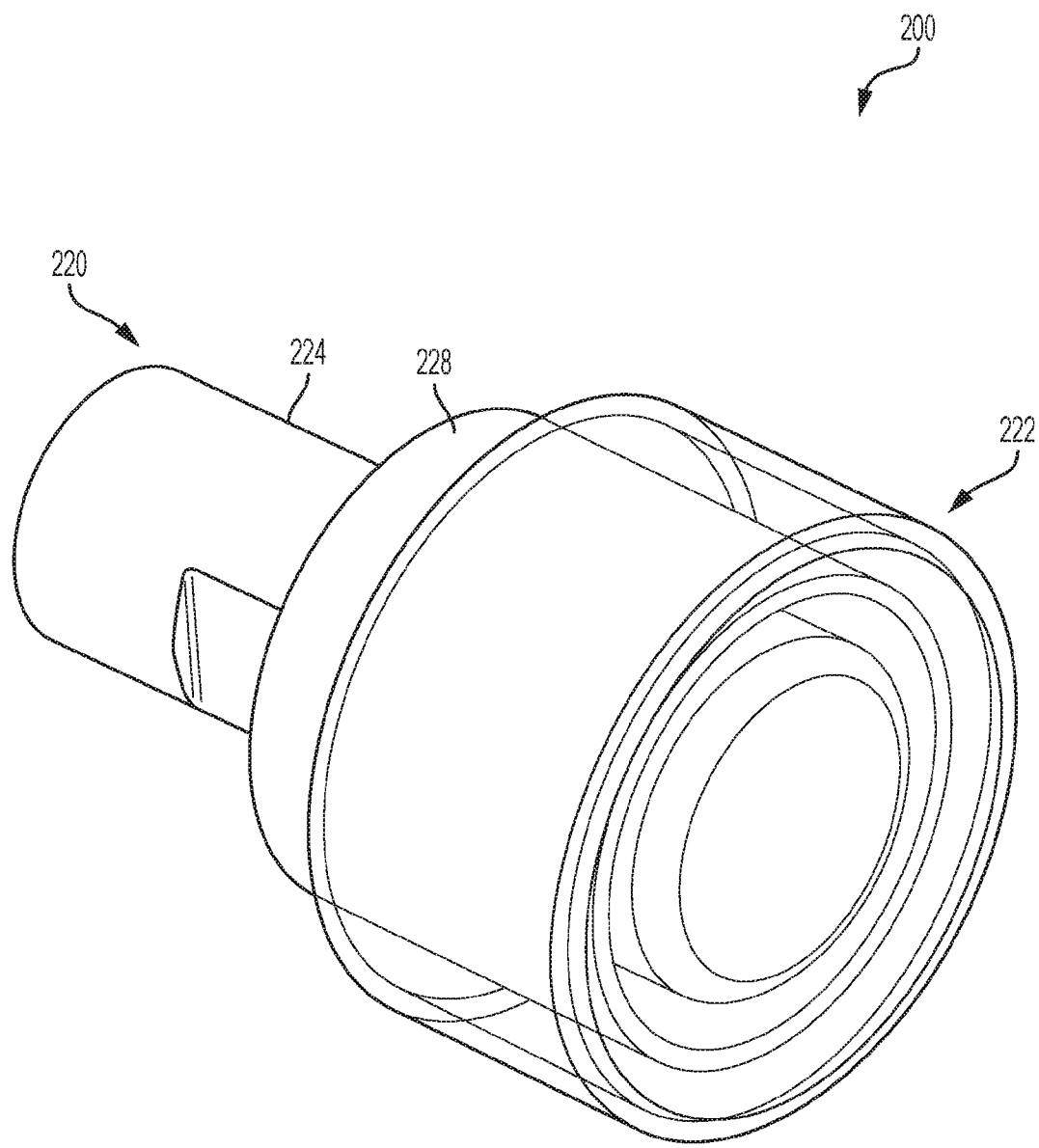
FIG. 6 is a perspective view of yet another breather vent assembly for a vehicle transmission, in accordance with the principles of the present application.
Figure 9:
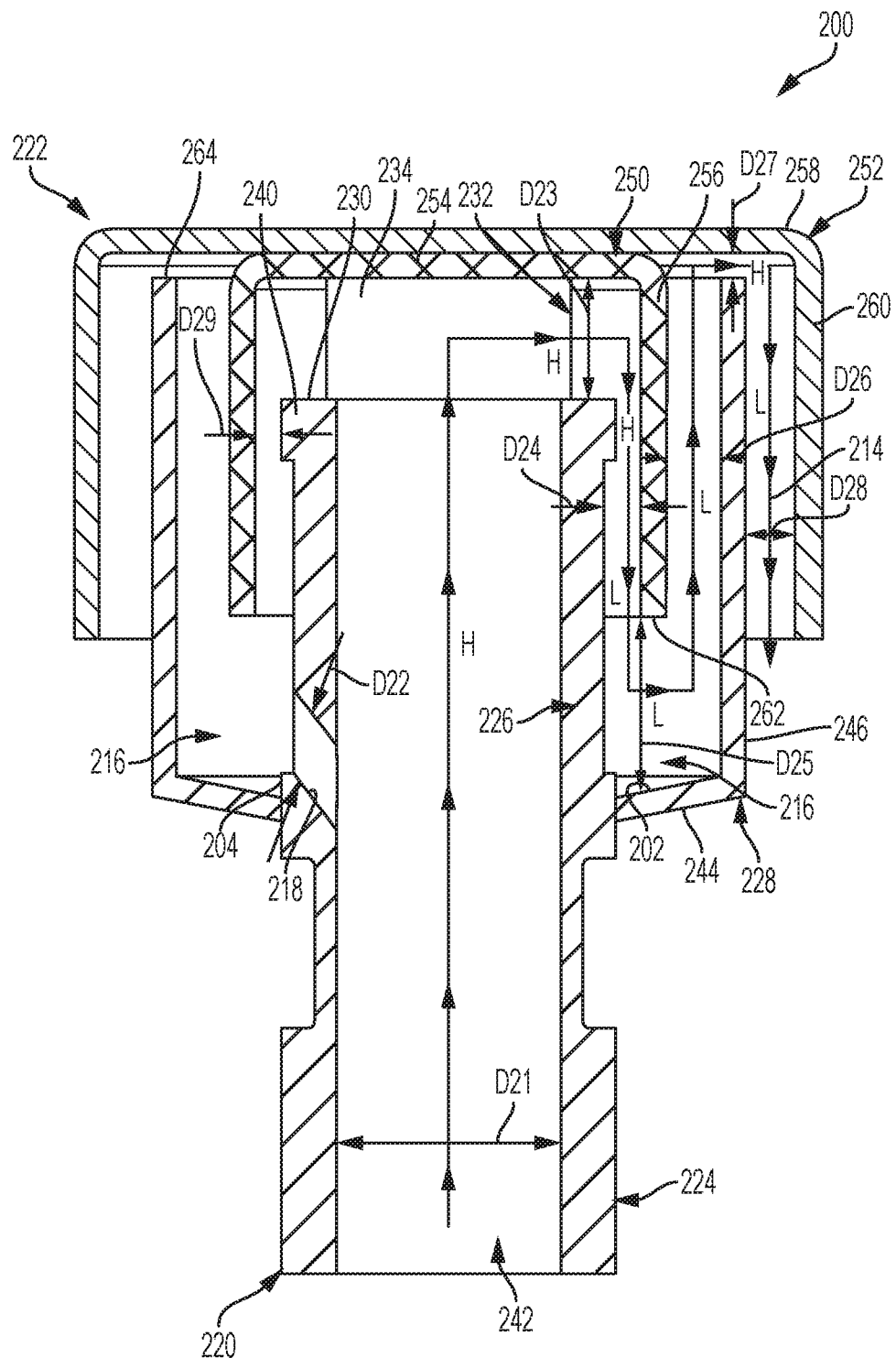
FIG. 9 is a cross-sectional view of the breather vent assembly shown in FIG. 8 and taken along line 9-9, in accordance with the principles of the present application.

As shown in FIG. 6, in the example implementation, breather vent assembly 200 generally includes a vent main body 220 and a cap 222. The tortuous path 214 is defined between the main body 220 and the cap 222, as illustrated in FIG. 9 and described herein in more detail.

The vent main body 220 generally includes a proximal or connecting tube portion 224, a distal or vent extension portion 226, and an upwardly extending retainer portion 228. The connecting tube portion 224 is configured to secure the vent main body 220 within aperture 30 of the transmission housing 32. As such, the connecting tube portion 224 connects internal cavity 34 of the transmission 12 with the exterior environment. In one example, connecting tube portion 224 includes threads (not shown) configured to be threadably received within aperture 30. However, the breather vent assembly 200 may be coupled to the transmission housing 32 by various other methods (e.g., via welding, interference fit).

The vent extension portion 226 extends upwardly from the connecting tube portion 224 and includes a lip or flange 240 at its distal end 230 where at least one passage 232 is defined. Moreover, the distal end 230 of vent extension portion includes one or more spacers 234 extending upwardly therefrom (see FIG. 7). Spacers 234 are configured to space cap 222 away from the distal end 230 of vent extension portion 226 and define passages 232. Main body 220 defines a vent passage 242 having a width or diameter D21 that is configured to receive vented gas from the transmission internal cavity 34. Vent passage 242 is configured to supply the vented gas to the tortuous path 214 via passage 232.

Retainer portion 228 generally includes a lower portion 244 and an upwardly extending wall portion 246. The lower portion 244 is coupled to connecting tube portion 224, and wall portion 246 extends upwardly from the lower portion 244 parallel to or substantially parallel to vent passage 242. In this way, lower portion 244, wall portion 246, and vent extension portion 226 together define reservoir 216 configured to collect condensed vapor from the vapor traveling through the vent passage 242 and the tortuous path 214. Moreover, as described above, lower portion 244 includes a wall 202 that slopes downwardly as it extends from wall portion 246 toward vent extension portion 226. As such, angled wall 202 directs the condensed vapor to the transmission internal cavity 34 via drain 218. In one example implementation, drain 218 has a width or diameter D22 that is less than D21, which facilitates directing the vent vapor through vent passage 242 rather than through drain 218.

In the example embodiment, cap 222 is configured to couple to vent extension portion 226 and generally includes an inner portion 250 and an outer portion 252. The inner portion 250 includes a base member 254 and an inner wall 256 extending downwardly therefrom. The inner portion 250 may be received within the outer portion 252 and coupled thereto. The outer portion 252 includes a base member 258 and an outer wall 260 extending downwardly therefrom.

Figure 8:
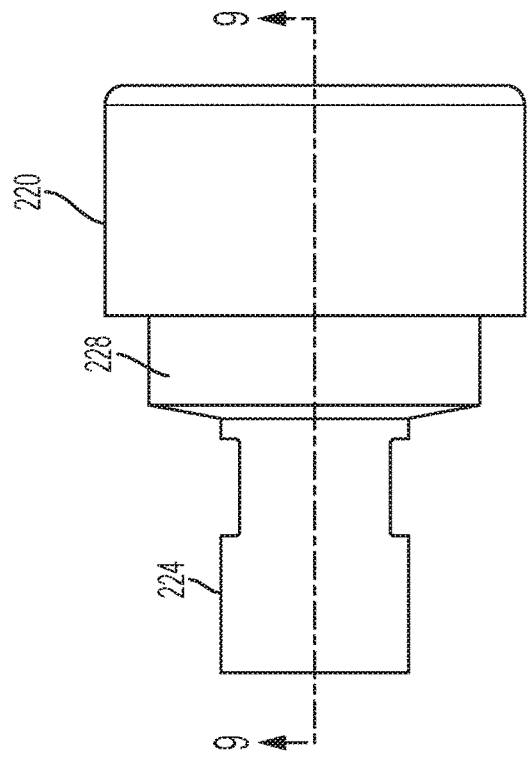
FIG. 8 is a side view of the breather vent assembly shown in FIG. 6, in accordance with the principles of the present application.
Figure 7:
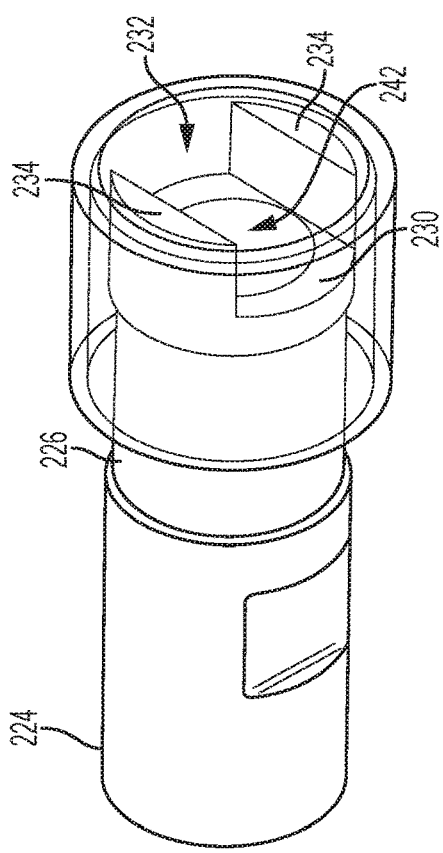
FIG. 7 is a perspective view of a portion of the breather vent assembly shown in FIG. 6, in accordance with the principles of the present application.

As shown in FIGS. 8 and 9, cap 222 is disposed about the vent main body 220 such that an inner wall 256 is disposed radially outward of vent extension portion 226 and radially inward of wall portion 246. In this manner, a width or diameter D23 of passage 232 is defined between distal end 230 and cap 222, a distance D24 is defined between the vent extension portion 226 and the inner wall 256, a distance D25 is defined between an end 262 of the inner wall 256 and the lower portion 244, and a distance D26 is defined between the inner wall 256 and the upwardly extending wall portion 246. In the illustrated example, vent extension portion 226, inner wall 256, wall portion 246, and outer wall 260 extend parallel to or substantially parallel to each other.

Cap 222 is further disposed about the vent main body 220 such that outer wall 260 is disposed radially outward of retainer portion 228 such that a distance D27 is defined between an end 264 of upwardly extending wall portion 246 and the base 254, a distance D28 is defined between the upwardly extending wall portion 246 and the outer wall 260, and a distance D29 is defined between flange 240 and inner wall 256.

In one example implementation, the flow area defined by D21 is greater than or equal to the flow area defined by D23. The flow area defined by D23 is greater than or equal to the flow area defined by D29. The flow area defined by D29 is less than the flow area defined by D24. The flow area defined by D24 is less than the flow area defined by D25. The flow area defined by D25 is greater than the flow area defined by D26. The flow area defined by D26 is greater than the flow area defined by D24. The flow area defined by D27 is less than the flow area defined by D26. The flow area defined by D28 is greater than the flow area defined by D27. The flow area defined by D28 is greater than the flow area defined by D26.

As such, the flow areas defined by D21, D23, D29, and D27 define high flow rate areas 'H'. The flow areas defined by D24, D25, D26, and D28 are greater than the high flow rate areas, thereby defining low flow rate areas 'L' of high flow volume. As discussed above, the low flow rate areas/zones allow time for the vapor to condense, while the high flow rate areas/zones and associated flow redirections promote the vapor to separate due to inertia and centrifugal forces such that any condensed vapor is collected in the reservoir 216 and returned to the transmission 12 via the drain 218.

In operation, when the pressure is increased in transmission 12, vapor enters vent passage 242 of the vent main body 220 toward cap 222. The vapor passes through passages 232 and is then redirected 180° or approximately 180° back toward the transmission 12 and reservoir 216 where condensed vapor is deposited. The condensate is drained via 218 back to the transmission 12, and the remaining gas vapor is then again redirected 180° or approximately 180° back toward a top of cap 222. The gas vapor is then again redirected 180° or approximately 180° back toward the transmission 12 before exiting the breather vent assembly 200 to the atmosphere and/or exterior of the transmission 12.

Figure 10:
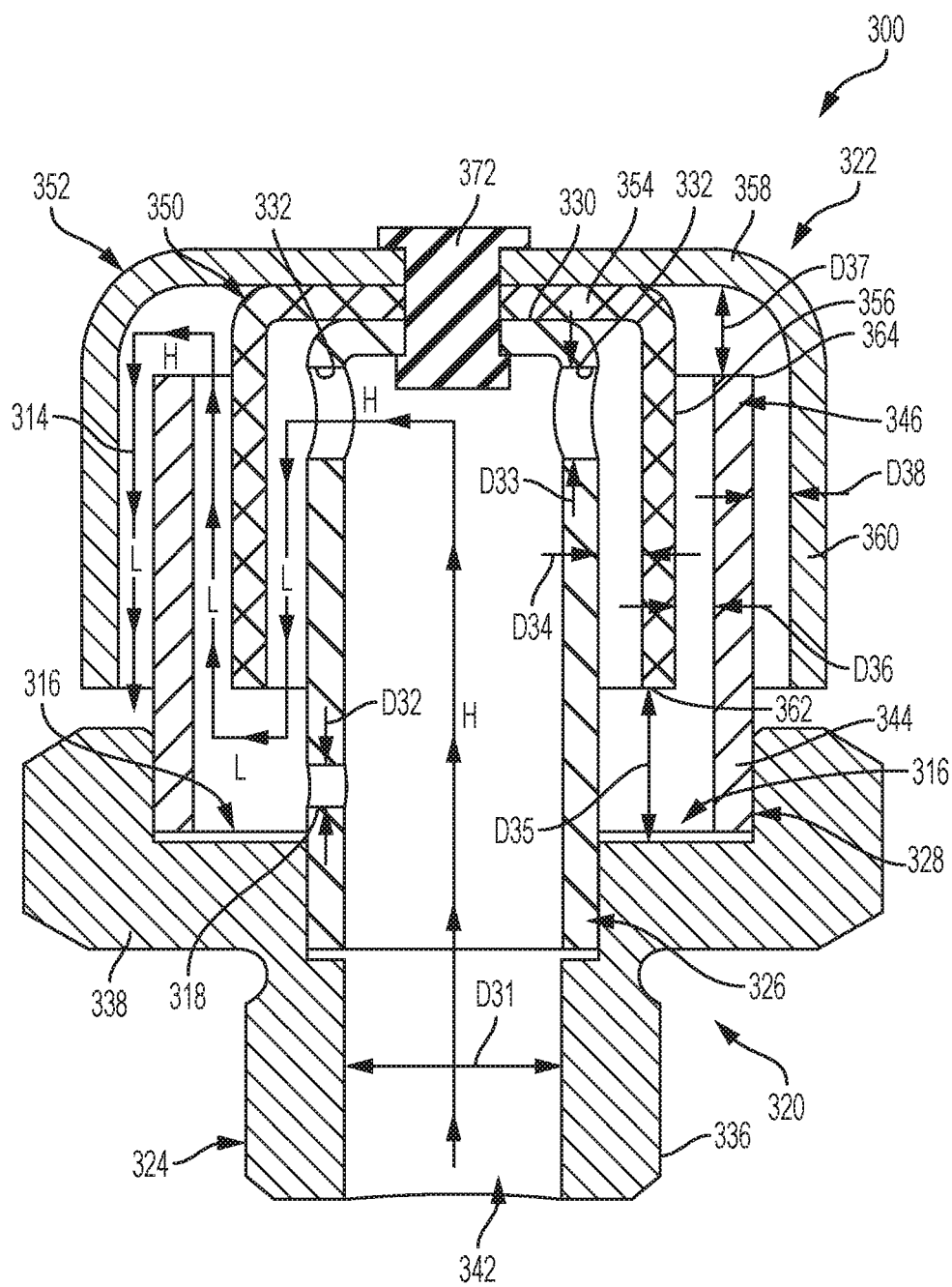
FIG. 10 is a cross-sectional view of yet another breather vent assembly in accordance with the principles of the present application.

With reference to FIG. 10, yet another example of a breather vent assembly 300 for transmission 12 is shown. The breather vent assembly 300 provides a tortuous path 314 for vapor to be vented out of the transmission 12. The breather vent assembly 300 further defines a reservoir 316 to collect condensed gas vapor, which reduces or prevents fluid from escaping transmission 12. As such, rather than just act as a plug, breather vent assembly 300 captures and collects condensed vapor by providing low flow rate zones to allow time for condensing, and provides high flow rate zones during flow redirection, which promotes vapor to separate due to inertia and centrifugal forces. Finally, the condensed vapor is returned to the source (i.e., transmission 12) via a passage or drain 318.

In the example implementation, breather vent assembly 300 generally includes a vent main body 320 and a cap 322. The tortuous path 314 is defined between the main body 320 and the cap 322, as illustrated in FIG. 10 and described herein in more detail.

The vent main body 320 generally includes a proximal or connecting tube portion 324, a distal or vent extension portion 326, and an upwardly extending retainer portion 328. The connecting tube portion 324 is configured to secure the vent main body 320 within aperture 30 of the transmission housing 32. As such, the connecting tube portion 324 connects internal cavity 34 of the transmission 12 with the exterior environment. In one example, connecting tube portion 324 includes threads (not shown) configured to be threadably received within aperture 30. However, the breather vent assembly 300 may be coupled to the transmission housing 32 by various other methods (e.g., via welding, interference fit).

The vent extension portion 326 is coupled to and extends upwardly from the connecting tube portion 224 and includes a distal end 330 where at least one passage 332 is defined. Moreover, the distal end 330 of vent extension portion includes an end surface 334 configured to be disposed against cap 322. The vent main body 320 defines an internal vent passage 342 having a width or diameter D31 that is configured to receive vented gas from the transmission internal cavity 34. Vent passage 342 is configured to supply the vented gas to the tortuous path 314 via passages 332.

Retainer portion 328 generally tubular and includes a lower portion 344 and an upwardly extending wall portion 346. The lower portion 344 is coupled to connecting tube portion 324, and wall portion 346 extends upwardly from the lower portion 344 parallel to or substantially parallel to vent passage 342. In this way connecting tube portion 324, lower portion 344, and vent extension portion 326 together define reservoir 316, which is configured to collect condensed vapor from the vapor traveling through the vent passage 342 and the tortuous path 314. In one example implementation, drain 318 has a width or diameter D32 that is less than D31, which facilitates directing the vent vapor through vent passage 342 rather than through drain 318.

In the example embodiment, cap 322 is configured to couple to vent extension portion 326 via a fastener 372 and generally includes an inner portion 350 and an outer portion 352. The inner portion 350 includes a base member 354 and an inner wall 356 extending downwardly therefrom. The inner portion 350 may be received within the outer portion 352 and coupled thereto via fastener 372. The outer portion 352 includes a base member 358 and an outer wall 360 extending downwardly therefrom.

As shown in illustrated example, cap 322 is disposed about the vent main body 320 such that an inner wall 356 is disposed radially outward of vent extension portion 326 and radially inward of wall portion 346. In this manner, a width or diameter D33 is defined for passage 332, a distance D34 is defined between the vent extension portion 326 and the inner wall 256, a distance D35 is defined between an end 362 of the inner wall 356 and the lower portion 344, and a distance D36 is defined between the inner wall 356 and the upwardly extending wall portion 346. In the illustrated example, vent extension portion 326, inner wall 356, wall portion 346, and outer wall 360 extend parallel to or substantially parallel to each other.

Cap 322 is further disposed about the vent main body 320 such that outer wall 360 is disposed radially outward of retainer portion 328 such that a distance D37 is defined between an end 364 of upwardly extending wall portion 346 and the base 354, and a distance D38 is defined between the upwardly extending wall portion 346 and the outer wall 360.

In one example implementation, the flow area defined by D31 is greater than or equal to the flow area defined by D33. The flow area defined by D34 is greater than the flow area defined by D33. The flow area defined by D35 is greater than the flow area defined by D34. The flow area defined by D35 is greater than the flow area defined by D36. The flow area defined by D36 is greater than the flow area defined by D34. The flow area defined by D37 is less than the flow area defined by D36. The flow area defined by D38 is greater than the flow area defined by D77. The flow area defined by D38 is greater than the flow area defined by D36.

As such, the flow areas defined by D31, D33, and D37 define high flow rate areas 'H'. The flow areas defined by D34, D35, D36, and D38 are greater than the high flow rate areas, thereby defining low flow rate areas 'L' of high flow volume. As discussed above, the low flow rate areas/zones allow time for the vapor to condense, while the high flow rate areas/zones and associated flow redirections promote the vapor to separate due to inertia and centrifugal forces such that any condensed vapor is collected in the reservoir 316 and returned to the transmission 12 via the drain 318.

In operation, when the pressure is increased in transmission 12, vapor enters vent passage 342 of the vent main body 320 toward cap 322. The vapor passes through passages 332 and is then redirected 180° or approximately 180° back toward the transmission 12 and reservoir 316 where condensed vapor is deposited. The condensate is drained via 318 back to the transmission 12, and the remaining gas vapor is then again redirected 180° or approximately 180° back toward a top of cap 322. The gas vapor is then again redirected 180° or approximately 180° back toward the transmission 12 before exiting the breather vent assembly 300 to the atmosphere and/or exterior of the transmission 12.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A breather vent assembly for a vehicle transmission, comprising:
   a vent main body defining an internal vent passage and including a proximal end, a distal end, and an upwardly extending retainer portion disposed outward of the distal end, the proximal end configured to couple to the transmission;
   a cap coupled to the vent main body and disposed at the distal end, wherein a tortuous path is defined between the vent main body and the cap such that a fluid vapor from the transmission is configured to flow through the internal vent passage and subsequently through the tortuous path to thereby vent the fluid vapor from the transmission;
   a reservoir defined between the distal end and the upwardly extending retainer portion, the reservoir in fluid communication with the tortuous path and configured to receive a condensate when a portion of the fluid vapor condenses in the tortuous path; and
   a drain passage extending through the vent main body and fluidly coupling the reservoir and the internal vent passage such that the condensate in the reservoir is drained back to the vehicle transmission,
   wherein a diameter of the vent passage is greater than a diameter of the drain passage to facilitate directing the fluid vapor through the vent passage rather than through the drain passage.

2. The assembly of claim 1, wherein the cap comprises an inner wall and an outer wall, the inner wall disposed between the vent main body distal end and the upwardly extending retainer portion, and the outer wall disposed outwardly of the upwardly extending retainer portion.

3. The assembly of claim 2, wherein the inner wall is disposed radially inward of the outer wall.

4. The assembly of claim 2, wherein the inner wall is coupled to a first base member and the outer wall is coupled to a second base member, the first base member coupled to the second base member.

5. The assembly of claim 1, further comprising a plurality of spacers extending outwardly from the vent main body distal end, the spacers configured to space the cap apart from the distal end such that a plurality of fluid passages are defined between the vent main body distal end and the cap.

6. The assembly of claim 1, wherein the upwardly extending retainer portion includes a lower portion and a wall portion, the lower portion coupled to the vent main body, and the wall portion extending from the lower portion substantially parallel to the vent main body.

7. The assembly of claim 6, wherein the lower portion defines an angled bottom wall at least partially defining the reservoir and configured to direct the condensate toward the drain.

8. The assembly of claim 7, wherein the vent main body defines a lip spacing the reservoir from the drain such that a predetermined amount of condensate collects in the reservoir before the condensate enters the drain.

9. The assembly of claim 1, wherein the vent main body distal end defines a flange extending outwardly into the tortuous path.

10. The assembly of claim 1, wherein the tortuous path makes a first turn of approximately 180° and a second turn of approximately 180°.

11. The assembly of claim 10, wherein the fluid vapor from the vent passage turns approximately 180° before the first turn of the tortuous path.

12. A breather vent assembly for a vehicle transmission, comprising:
a vent main body defining an internal vent passage and including a proximal end, a distal end, and an upwardly extending retainer portion disposed outward of the distal end, the proximal end configured to couple to the transmission;
a cap coupled to the vent main body and disposed at the distal end, wherein a tortuous path having first and second turns is defined between the vent main body and the cap such that a fluid vapor from the transmission is configured to flow through the internal vent passage and subsequently through the tortuous path to thereby vent the fluid vapor from the transmission;
a reservoir defined between the distal end and the upwardly extending retainer portion, the reservoir in fluid communication with the tortuous path and configured to receive a condensate when a portion of the fluid vapor condenses in the tortuous path; and
a drain passage extending through the vent main body and fluidly coupling the reservoir and the internal vent passage such that the condensate in the reservoir is drained back to the vehicle transmission,
wherein a first high flow rate area is defined between the vent main body distal end and the cap, a first low flow rate area is defined between the vent main body and the cap, a second low flow rate area is defined at the first turn, a third low flow rate area is defined between the retainer portion and the cap, and a second high flow rate area is defined at the second turn,
wherein the first and second high flow rate areas are configured to promote fluid vapor separation due to inertia and centrifugal forces, and the first, second, and third low flow rate areas are configured to allow time for condensing of the fluid vapor.

13. The assembly of claim 1, wherein the drain passage is disposed substantially perpendicular to the vent passage.

14. The assembly of claim 1, wherein the drain passage extends through the vent main body at a non-orthogonal angle relative to the tortuous path.

15. A breather vent assembly to minimize pressure differentials between the interior and exterior of a vehicle transmission, comprising: a tubular vent main body having a proximal end, a distal end, and defining a vent passage configured to couple to the vehicle transmission and receive a fluid vapor therefrom, the proximal end configured to couple to the vehicle transmission;
a retainer portion coupled to the vent main body and disposed radially outward thereof, the retainer portion including a lower portion and a wall portion, the wall portion extending from the lower portion substantially parallel to the vent main body;
a cap having a base member, an inner wall, and an outer wall, the inner wall extending from the base member and disposed between the vent main body and the wall portion, the outer wall extending from the base member and disposed radially outward of the wall portion;
a tortuous path defined between the vent main body and the cap and configured to receive the fluid vapor;
a reservoir defined between the vent main body and the retainer portion, the reservoir in fluid communication with the tortuous path and configured to receive a condensate when a portion of the fluid vapor condenses in the tortuous path;
a drain passage extending through the vent main body and fluidly coupling the reservoir and the vent passage such that the condensate in the reservoir is drained back to the vehicle transmission;
wherein the tortuous path includes a first section extending through the vent passage, a second section extending between the vent main body distal end and the cap base, a third section extending between the vent main body and the inner wall, a fourth section extending between the vent main body and the wall portion, a fifth section extending between the inner wall and the wall portion, a sixth section extending between the inner wall and the outer wall, and a seventh section extending between the wall portion and the outer wall.

16. The assembly of claim 15, wherein the first section, the third section, the fifth section, and the seventh section are substantially parallel.

17. The assembly of claim 16, wherein the second section, the fourth section, and the sixth section are substantially parallel to each other and substantially perpendicular to the first, third, fifth, and seventh sections.

18. The assembly of claim 17, wherein the tortuous path is redirected approximately 180° between the first and third sections, the third and fifth sections, and the fifth and seventh sections.

* * * * *